Dec. 12, 1933.                H. G. WINKLER                1,939,029
                              SLICING MACHINE
                           Filed Oct. 21, 1930
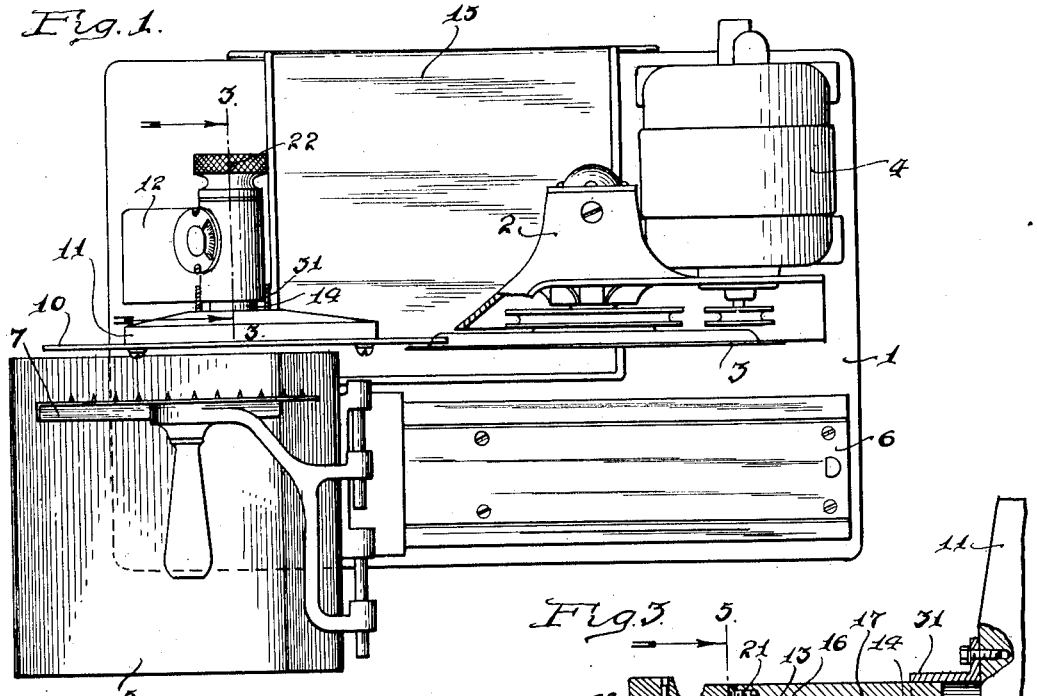
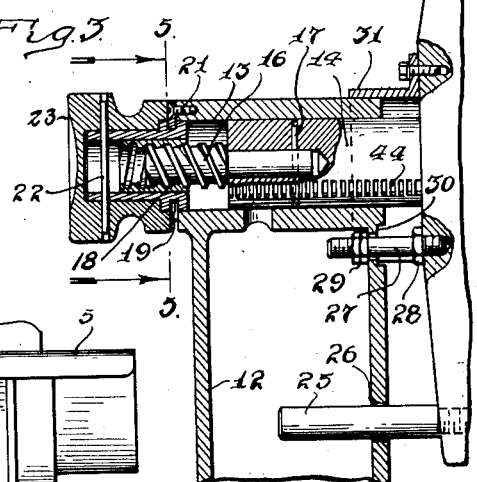
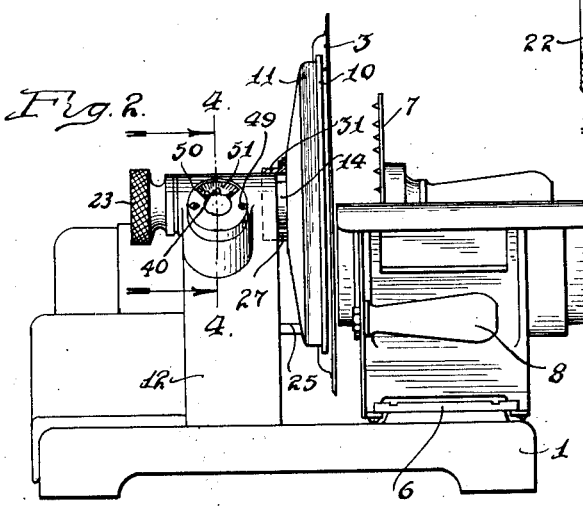
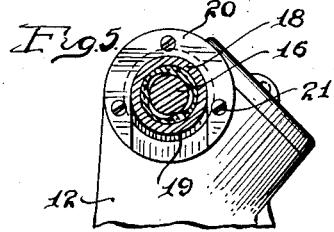
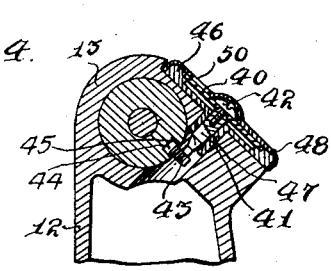
INVENTOR.
HERMAN G. WINKLER.
BY *Barnes and Kisselle*
ATTORNEYS.

Patented Dec. 12, 1933

1,939,029

UNITED STATES PATENT OFFICE 1,939,029

SLICING MACHINE

Herman G. Winkler, Detroit, Mich., assignor to Barnes Scale Company, Detroit, Mich., a corporation of Michigan Application October 21, 1930. Serial No. 490,257

3 Claims. (Cl. 146—102)

This invention has to do with a slicing machine and it relates particularly to a slicing machine which embodies what may be termed a gauge plate adjustable relative to the plane of the knife for determining slice thickness. The gauge plate construction embodies an adjustment by means of which it is readily shifted and also, preferably, an indicator by means of which the operator may ascertain the thickness of the slice to be cut.

Fig. 1 is a plan view of a slicing machine with some parts cut away in illustration of a slicing machine contemplated by the present invention.

Fig. 2 is an end thereof looking from the left of Fig. 1.

Fig. 3 is a vertical section taken through the gauge plate supporting bracket and illustrating the adjusting mechanism.

Fig. 4 is a section taken substantially on line 4—4 of Fig. 2 illustrating the indicating mechanism.

Fig. 5 is a section taken substantially on line 5—5 of Fig. 3.

The slicing machine comprises a base 1 upon which is mounted in a housing 2, a disk knife 3 designed to be rotated by motor 4. A carriage 5 is mounted upon a way 6 for reciprocation across the cutting edge of the knife, reciprocating generally in the plane of the knife. There may be employed in connection with the carriage a pusher plate or follower illustrated at 7 provided with a handle by means of which the material to be sliced is urged up against a gauge plate while the carriage may be hand operated by means of a handle 8.

The gauge plate per se may be in the form of a plate 10 secured to a support 11 by means of screws as shown. Secured to the base 1 in any suitable manner, as for example by means of welding, is a pedestal 12 advantageously of hollow formation and provided at its upper end with a horizontal bore or bearing like member of tubular formation, as illustrated at 13. The plate 11 carries a stud 14 which projects from its rear face into the bearing 13. The bearing 13 and stud 14 are of similar shape in cross section and advantageously may be round. By reference to Fig. 1 it will be noted that as the material to be sliced is pressed up against the gauge plate 10 and then the carriage reciprocated across the knife that a slice is cut therefrom the same falling upon slice receiving tray 15.

For the purpose of adjusting the gauge plate relative to the plane of the knife for determining slice thickness, the stud 14 is reciprocated in its supporting member, or bearing 13. For this purpose a screw member 16 projects from the end of the stud, the same being secured thereto as by means of a pin 17. An internally threaded nut 18 is screw threaded on the member 16, and for the purpose of reciprocating the stud 14 the nut is to be held stationary axially. To accomplish this the nut may advantageously be formed with a circumferential groove 19 into which a U shaped washer or retaining member 20 fits, the same being secured to the supporting member as by means of screws 21 and being in inverted position. A suitable operating part or handle 23 which may be in the form of a knurled knob, fits over the nut 18 and preferably extends up snugly against the exterior face of washer 20 and it may be secured to the nut as by means of a pin 22.

As stated above, the stud 14 and its bearing member may be round in cross section, and accordingly, means are provided to keep the gauge plate from rotating. This means takes the form of stud 25 carried by the support 11, and extending through an opening 26 with a fit close enough to permit the stud to readily reciprocate in the opening but stopping any substantial rotary movement of the gauge plate or turning of the stud 14 in the bearing member 13. The adjustable movement of the gauge plate may be limited and preferably is so limited, and this may be accomplished by a stud 27 which may be screw threaded into the support 11 as shown, and fixed as by means of a nut 28, the same projecting through an opening in the inner wall of the bracket and provided with a suitable nut 29. The wall of the pedestal facing the support 11 may be recessed as at 30.

From the above described construction it will be noted that the gauge plate is adjustable by rotation of the knob 23. When this is done the screw member 16 is reciprocated axially, carrying with it the gauge plate, the knob at this time being held stationary axially by means of the retaining member 20. Movement away from the pedestal is limited by the nut 29, and in this position the gauge plate preferably lies substantially in the plane of the cutting edge of the knife. Movement away from the plane of the cutting edge of the knife is limited by reason of the bracket 11 abutting up against the pedestal, at which time the nut 28 is accommodated by the recess 30. In order to cover the variable space between the support 11 and bracket 12 a collar 31 may be employed. This collar is angular in cross section with one leg of the angle secured to the support 11 as shown, and the collar is of semi-circular or U shape so that it can be slipped down over the upper end of the bracket in inverted position.

The indicating means may comprise a disk 40 provided with suitable indicia, as shown in Fig. 2, secured to a stub shaft 41 as by means of a screw 42. On the lower end of the stub shaft is a gear 43 which meshes with a rack 44. This rack may be a separate piece located in a longitudinal groove or way 45 in the stud 14. A supporting member 46 underlies the disk 40 and the disk advantageously is supported thereby around its outer edge as shown, while the member 46 has an extension 47 in which the stub shaft 41 is journaled. Over the assembly may be placed a cover plate 48 secured to the member 46 by screws 49 which are screw threaded into the member 46 beyond the periphery of the disk 40. This cover plate is provided with an opening 50 to render a portion of the disk visible, and the disk may be provided with a mark as at 51 with which the indicia on the disk are lined up to determine slice thickness. As the gauge plate is adjusted the disk is rotated and the indicia thereon indicate the thickness of the slice to be cut. When the gauge plate is in the plane of the knife the indicator shows zero. The pinion is properly located on the rack because it hangs suspended from the disk 40 and the location of the seat for the disk and the length of the stub shaft 41 are calculated to effect this result. It is advantageous to position the disk at an angle to the vertical and a position about 45° to the vertical is advantageous to present a clear view thereof to the operator.

This arrangement of indicator and gauge plate control has the special feature of providing indication of the location of the gauge plate by movement of the gauge plate itself rather than by movement of the control element. The indicator disk has a maximum indicating movement of one rotation. This permits of arranging the screw so that the knob 22 may be capable of having more than one complete rotation for effecting maximum adjustment of the gauge plate. In other words, the screw may be designed so that the knob 22 may have any desired number of rotations while the gauge plate is moving its forwardmost position to its rearwardmost position; for example, the knob may be capable of moving through two complete rotations. This is not feasible to do when the indicator works from the controlling element. According to the present invention, however, the indicator works directly from the gauge plate and accurately shows its position irrespective of the controlling element.

I claim:

1. The combination with a gauge plate supporting bracket provided with a horizontal opening, a gauge plate support positioned in the opening and axially shiftable therein, said bracket having a portion positioned at an angle to the vertical, a stub shaft journaled in the support perpendicularly to said portion, a gear on the stub shaft, a rack on the gauge plate support with which the gear meshes, and indicating means secured to the stub shaft and disposed at an angle corresponding to the angle of the said portion of the bracket.

2. The combination with a gauge plate supporting bracket provided with a horizontal opening, a gauge plate support positioned in the opening and axially shiftable therein, said bracket having a portion positioned at an angle to the vertical, a stub shaft journaled in the support perpendicularly to said portion, a gear on the stub shaft, a rack on the gauge plate support with which the gear meshes, and indicating means secured to the stub shaft and disposed at an angle corresponding to the angle of the said portion of the bracket, said indicating means comprising a disk, an underlying support therefor constituting a frictional support for the disk and having a portion which forms a bearing for the stub shaft.

3. In a slicing machine of the type having a rotary disk knife, a material-supporting carriage for carrying the material past the cutting edge of the knife, and a gauge plate for determining slice thickness, a gauge plate structure comprising a pedestal having an aperture therein presenting an elongated internal-bearing surface its axis extending generally in the direction of the axis of the rotary disk knife, a gauge plate, a stud on the gauge plate which fits within the aperture, said aperture and stud being substantially round in cross section, said pedestal having another aperture therein removed from the first mentioned aperture, a stud on the gauge plate slidably situated in the second aperture for holding the gauge plate from rotating upon its supporting stud, a screw member attached to the supporting stud in the first mentioned aperture, and an internally threaded manually operable nut for cooperation with the screw threaded member on the stud, means for mounting the nut for rotation upon the pedestal in axial alignment with the first mentioned aperture therein, said means holding the nut against axial movement whereby turning of the nut advances and retracts the gauge plate, means interconnecting the gauge plate and pedestal and slidable as to one for limiting the movement of the gauge plate, and a protecting collar attached to the gauge plate and overlying the adjacent portion of the pedestal having the first mentioned aperture.

HERMAN G. WINKLER.